US008289926B2

(12) United States Patent
Wu

(10) Patent No.: US 8,289,926 B2
(45) Date of Patent: Oct. 16, 2012

(54) METHOD OF SETTING RADIO ACCESS CAPABILITY IN A WIRELESS COMMUNICATIONS SYSTEM AND RELATED COMMUNICATION DEVICE

(75) Inventor: Chih-Hsiang Wu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 415 days.

(21) Appl. No.: 12/632,819

(22) Filed: Dec. 8, 2009

(65) Prior Publication Data

US 2010/0144307 A1    Jun. 10, 2010

Related U.S. Application Data

(60) Provisional application No. 61/120,491, filed on Dec. 8, 2008.

(51) Int. Cl.
H04W 4/00 (2009.01)
H04J 3/16 (2006.01)

(52) U.S. Cl. .................. 370/331; 370/465
(58) Field of Classification Search ............ None
See application file for complete search history.

(56) References Cited

U.S. PATENT DOCUMENTS

| 8,089,942 B2 * | 1/2012 | Cai et al. ............ 370/338 |
| 8,155,040 B2 * | 4/2012 | Franklin et al. ........ 370/310 |
| 2006/0084443 A1 | 4/2006 | Yeo |
| 2006/0094397 A1 | 5/2006 | Raghuram |
| 2006/0133311 A1 | 6/2006 | Drevon |
| 2007/0287419 A1 | 12/2007 | Wang |
| 2008/0045262 A1 * | 2/2008 | Phan et al. ............. 455/525 |
| 2008/0102784 A1 | 5/2008 | Mittal |
| 2008/0220772 A1 | 9/2008 | Islam |
| 2009/0046596 A1 * | 2/2009 | Ewe et al. ............. 370/252 |
| 2009/0075657 A1 * | 3/2009 | Klatt ................... 455/436 |
| 2009/0124224 A1 * | 5/2009 | Hildebrand et al. .... 455/150.1 |
| 2009/0180451 A1 * | 7/2009 | Alpert et al. ........... 370/338 |
| 2010/0113010 A1 * | 5/2010 | Tenny et al. ........... 455/423 |

FOREIGN PATENT DOCUMENTS

WO    2008052123 A1    5/2008

OTHER PUBLICATIONS

3GPP TS 24.008 V8.3.0 Mobile radio interface Layer 3 specification; Core network protocols; Stage 3, Sep. 2008.
3GPP TS 24.301 V1.0.0 Non-Access-Stratum (NAS) protocol for Evolved Packet System (EPS), Sep. 2008.
European patent application No. 11002412.2, European application filed: Dec. 8, 2009, European Search Report mailing date: Jun. 1, 2011.
Office action mailed on Jun. 30, 2011 for the European application No. 11002412.2, filed Dec. 8, 2009, p. 1-6.

* cited by examiner

Primary Examiner — Nittaya Juntima
(74) Attorney, Agent, or Firm — Winston Hsu; Scott Margo

(57) ABSTRACT

A method of setting radio access capability for a mobile device capable of a plurality of radio access technologies includes utilizing a first one of the radio access technologies to send subscribing information of the mobile device to a network, receiving a reject message corresponding to the subscribing information from the network, selecting a second radio access technology from the plurality of radio access technologies, and sending the subscribing information according to the second radio access technology.

15 Claims, 5 Drawing Sheets

METHOD OF SETTING RADIO ACCESS CAPABILITY IN A WIRELESS COMMUNICATIONS SYSTEM AND RELATED COMMUNICATION DEVICE

CROSS REFERENCE TO RELATED APPLICATIONS

This application claims the benefit of U.S. Provisional Application No. 61/120,491, filed on Dec. 8, 2008 and entitled "METHOD AND APPARATUS FOR SETTING RAT CAPABILITY IN A WIRELESS COMMUNICATIONS SYSTEM" the contents of which are incorporated herein in their entirety.

BACKGROUND OF THE INVENTION

1. Field of the Invention

A method and related communication device used in a wireless communication system is disclosed and more particularly, to a method of setting radio access technology (RAT) capability in a wireless communications system and related communication device.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of user equipments (UEs) each including a mobile entity and a USIM (Universal Subscriber Module). A core network, i.e. Evolved Packet Core (EPC), is responsible for UE registration, authentication, handover mobility, etc, through the E-UTRAN.

A UE with multi-modes supports multiple radio access technologies (RATs), such as GSM (Global System for Mobile communications), UMTS (Universal Mobile Telecommunications System), and LTE systems. A connection in LTE can be established by the eNB only if the UE has a normal service capability in the LTE cell. The normal service capability herein means that the UE has a USIM inserted and the core network accepts the registration of the UE. In other words, the inter-RAT handover is inapplicable for the UE with an invalid USIM.

On the other hand, the multi-mode UE tends to always select a LTE cell instead of a cell of other RATs (a non-LTE cell) due to system/procedure design (e.g. a measurement report). One of designs is that a measurement report of the UE is generated based on a measuring algorithm that always results in higher performance result in the LTE cell measurement over other RAT cell measurement. Such measurement result always leads the UE to select/reselect a LTE cell. As a result, it is difficult for the UE with the invalid USIM to select the non-LTE cell during cell selection. This affects emergency service provision.

Take an emergency call service for example. The emergency call service is not supported in the LTE system, but is supported in the GSM and UMTS systems. When the UE camping on a LTE cell sends an emergency call request, an eNB of the LTE cell requests the UE to perform a handover to camp on a GERAN (GSM/EDGE Radio Access Network) cell or a UTRAN (UMTS Terrestrial Radio Access Network) cell. The eNB also transfers the handover request to the core network that responds with a reject message indicating that the UE does not have the normal service capability. In this situation, the eNB cannot initiate the handover for the UE due to the reject message. The UE has no way to access to the GERAN or UTRAN after receiving the reject message from the network. The procedure to establish the emergency call is therefore abandoned.

The emergency call service demands urgency of a fast-established connection and is specified by national requirements, e.g. FCC (Federal Communications Commission). In the prior art, the multimode UE without normal service fails in emergency call establishment in the LTE system.

SUMMARY OF THE INVENTION

Therefore, a method of setting radio access capability in a wireless communication system and related communication device are provided to avoid failure of call establishment.

A method of setting radio access capability for a mobile device capable of a plurality of RATs is disclosed. The method includes utilizing a first RAT of the plurality of RATs to send subscribing information of the mobile device to a network, receiving a reject message corresponding to the subscribing information from the network, selecting a second radio access technology from the plurality of radio access technologies, and sending the subscribing information according to the second radio access technology.

A communication device of a wireless communication system for accurately setting radio access capability is disclosed. The communication device includes means for sending subscribing information of the communication device to a network according to the RAT capability data corresponding to a first RAT of the plurality of RATs supported by the communication device, means for receiving a reject message corresponding to the subscribing information from the network, means for selecting a second radio access technology from the plurality of radio access technologies, and means for sending the subscribing information according to the second radio access technology.

A method of setting RAT for a mobile device capable of a plurality of RATs is disclosed. The method includes utilizing a first RAT of the plurality of RATs to send subscribing information of the mobile device to a network, and disabling capability of one of the plurality of RATs when a reject message corresponding to the subscribing information is received from the network.

A communication device of a wireless communication system for accurately setting radio access capability is disclosed. The communication device includes means for sending subscribing information of the communication device to a network according to a first RAT of a plurality of RATs supported by the communication device, and means for disabling capability of one of the plurality of RATs when a reject message corresponding to the subscribing information is received from the network.

These and other objectives will no doubt become obvious to those of ordinary skill in the art after reading the following detailed description of the preferred example that is illustrated in the various figures and drawings.

DETAILED DESCRIPTION

Figure 1:
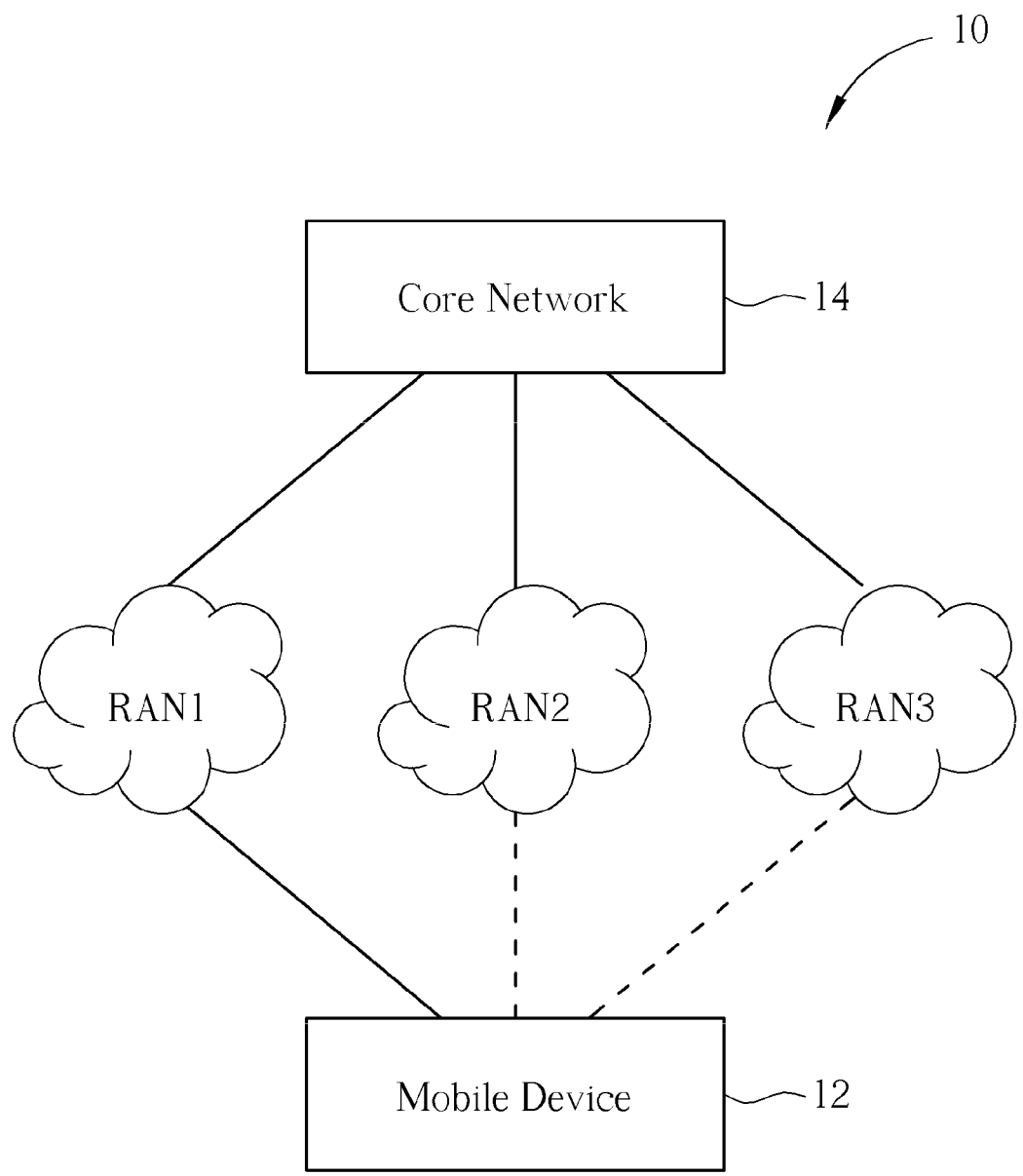
FIG. 1 is an exemplary schematic diagram of a wireless communication system.

Please refer to FIG. 1, which illustrates a schematic diagram of a wireless communication system 10. In the wireless communication system 10, a mobile device 12, seen as a multi-mode mobile device, supports multi radio access technologies and thereby can communicate with a core network 14 via a radio access network RAN1, RAN2 or RAN3. The core network 14 is responsible for verifying subscribing information of the mobile device 10. The RAN1, RAN2 and RAN3 are different technologies and can be a GSM (Global System for Mobile communications)/GPRS (General Packet Radio Service), a UMTS (Universal Mobile Telecommunications System), and a LTE (Long term evolution) technology. In the LTE system, the network is referred as an evolved base station (eNB) or a EUTRAN (evolved-UTAN) which includes a plurality of eNBs and can communicate with a core network, whereas the mobile devices are referred as user equipments (UEs). The UEs can be devices such as mobile phones, computer systems, etc.

Figure 2:
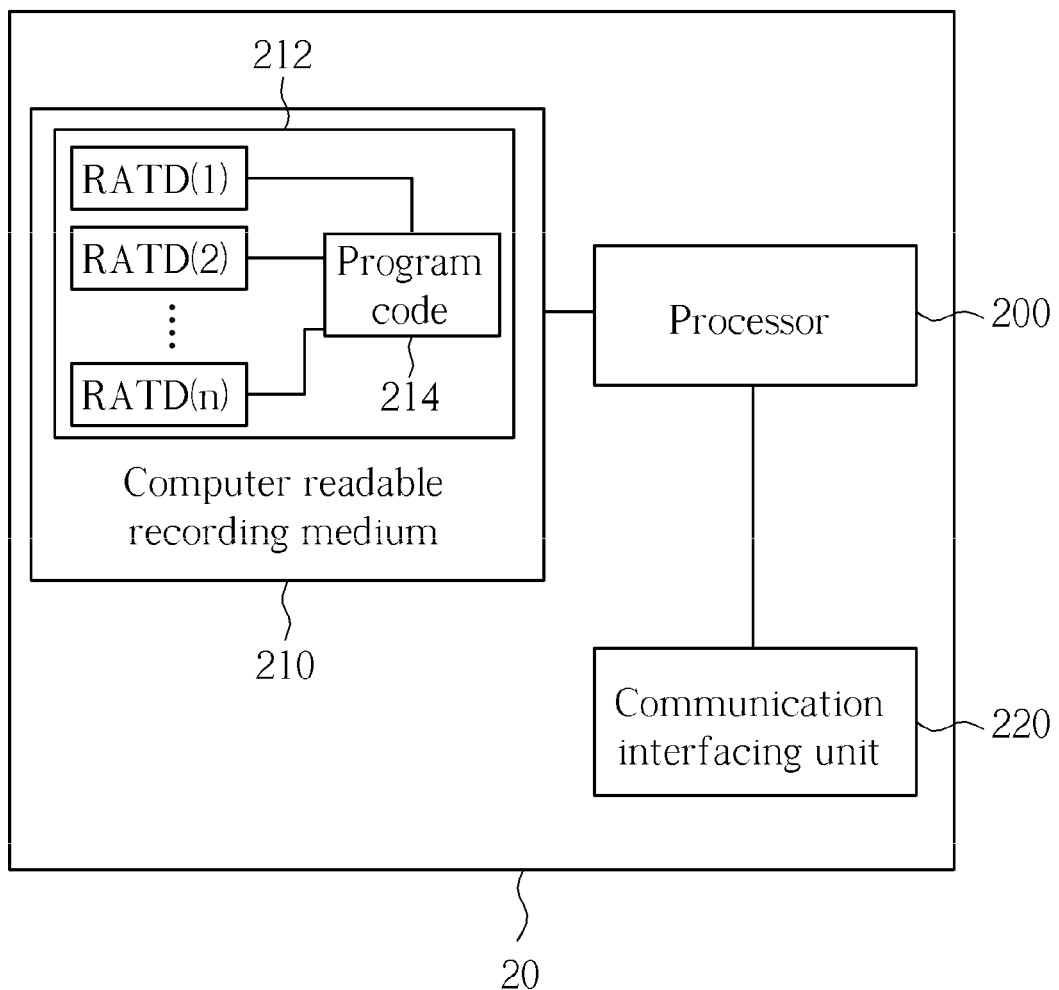
FIG. 2 is an exemplary schematic diagram of a communication device.

Please refer to FIG. 2, which illustrates a schematic diagram of a communication device 20. The communication device 20 can be the mobile devices shown in FIG. 1 and supports multiple radio access technologies, e.g. the GSM, the UMTS, the LTE systems, etc. The communication device 20 includes a processor 200, a computer readable recording medium 210 and a communication interfacing unit 220. The computer readable recording medium 210 is any data storage device that includes RAT capability data RATD(1)-RATD(n) and program code 214, thereafter read and processed by the processor 200. Some examples of the computer readable recording medium 210 include an universal subscriber identity module (USIM), read-only memory (ROM), random-access memory (RAM), CD-ROMs, magnetic tapes, hard disks, optical data storage devices, and carrier waves (such as data transmission through the Internet). The communication interfacing unit 220 is preferably a radio transceiver and accordingly exchanges wireless signals with the network.

When the communication device 20 enables a RAT capability, hardware/software configuration is set according to corresponding RAT capability data. For example, the communication interfacing unit 220 tunes to a LTE frequency band and enables an OFDM (Orthogonal Frequency Division Multiplexing) module according to the RAT capability data associated with the LTE (e.g. RATD(1)) when the RAT capability for the LTE system is enabled. As to disabling of the RAT capability, the hardware/software configuration is set according to other RAT capability (e.g. one of the RATD(2)-RATD(n)) or set to null/predetermined values. Another situation can also be considered the disabling of the RAT capability. That is, the communication device 20 notifies the network that the corresponding RAT capability is removed, but does not really turn off the functions about the RAT capability.

Figure 3:
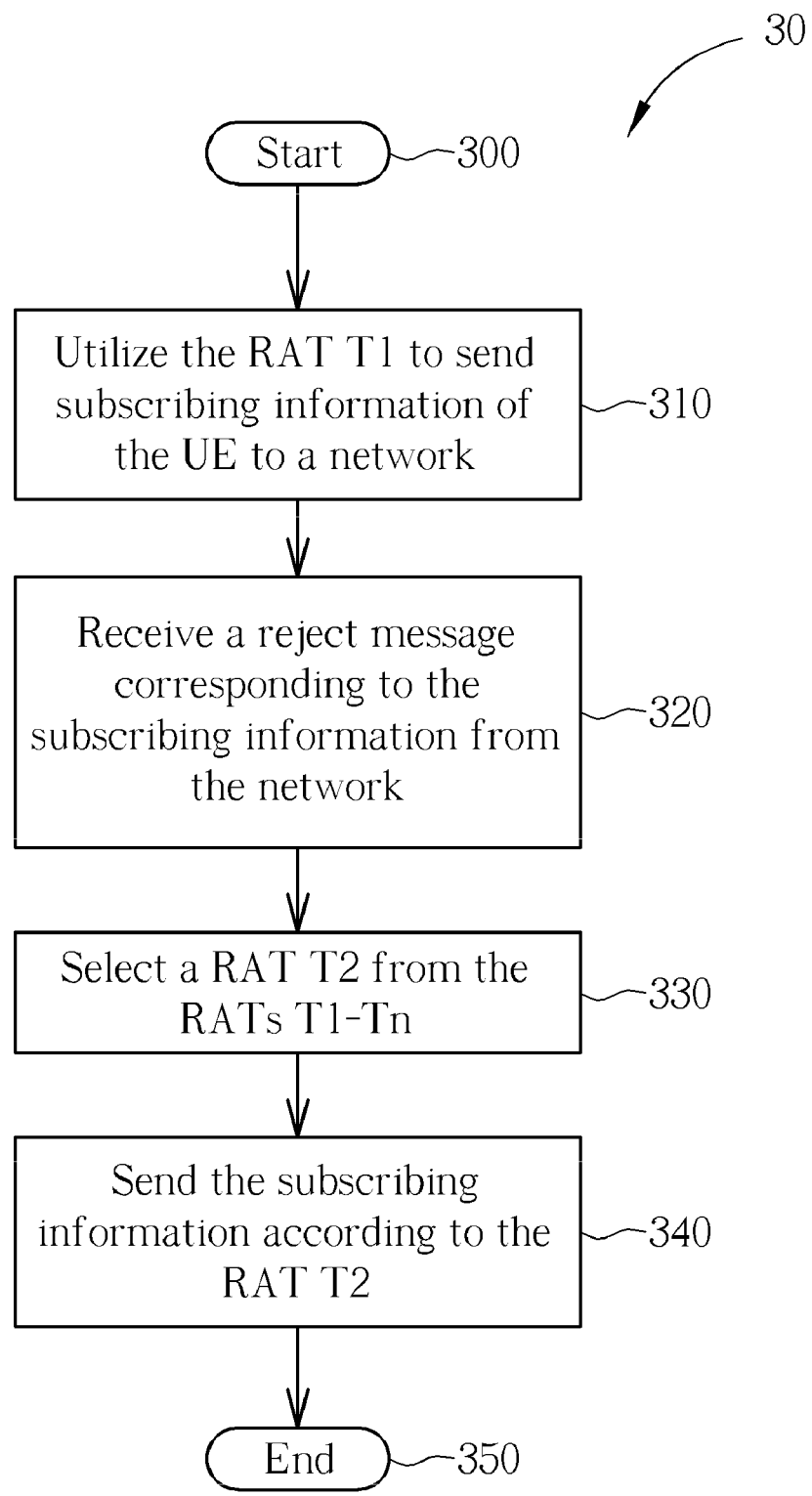
FIG. 3 is an exemplary flowchart of an exemplary process.

Please refer to FIG. 3, which illustrates a flowchart of an exemplary process 30. The exemplary process 30 is utilized for setting radio access capability for a UE capable of RATs T1-Tn in a wireless communication system. The exemplary process 30 can be compiled into the program code 214 and includes the following steps:

Step 300: Start.

Step 310: Utilize the RAT T1 to send subscribing information of the UE to a network.

Step 320: Receive a reject message corresponding to the subscribing information from the network.

Step 330: Select a RAT T2 from the RATs T1-Tn.

Step 340: Send the subscribing information according to the RAT T2.

Step 350: End.

According to the process 30, the UE utilizes the RAT T1 to sends the subscribing information to a network and disables capability of the RAT T1 when the reject message is received. The reject message may include information indicating that the subscribing information is invalid so that the UE can know the access request is rejected. The access request may be used for the UE to make an emergency call. The invalid subscribing information means that the UE is not a legal UE for the network, and therefore the UE is not allowed to access the network though the RAT T1. The UE selects any of the RATs T2-Tn (T2 as example herein) to send the subscribing information. The UE may disable capability of the RAT T1 when the reject message is received. In this situation, the UE may utilize the selected RAT to send capability information indicating that capability of the RAT T1 has been removed.

Through the exemplary process 30, when the UE disables capability of an invalid RAT, the UE can turn to select other RATs and then can send subscribing information related to the newly-used RAT for connection establishment. Through the exemplary process 30, abandonment of the connection establishment is avoided. Especially, the emergency call can be established successfully in emergency.

The subscribing information can include at least one of a mobile identity, a LOCATION UPDATING REQUEST message of a location updating procedure, a ROUTING AREA UPDATE REQUEST message of a routing area update procedure using the UMTS or GSM/GPRS RAT, an ATTACH REQUEST message of an attach procedure using the LTE, UMTS or GSM/GPRS RAT, a TRACKING AREA UPDATE REQUEST message of a tracking area update procedure using the LTE RAT and a SERVICE REQUEST message of a service request procedure using the LTE, UMTS or GSM/GPRS RAT. Examples of the mobile identity can include an international mobile subscriber identity (IMSI), a temporary mobile subscriber identity (TMSI/P-TMSI), an international mobile equipment identity (IMEI), an international mobile equipment identity together with the software version number (IMEISV), a Globally Unique Temporary Identifier (GUTI), P-TMSI signature and a temporary mobile group identity (TMGI).

The LOCATION UPDATING REQUEST, ROUTING AREA UPDATE REQUEST, ATTACH REQUEST, TRACKING AREA UPDATE REQUEST, and SERVICE REQUEST messages are used as a message for requesting access to the target network. Those messages are examples and not intend to limit the scope. In this situation, the received reject message can also be considered indicating that the USIM is invalid. Accordingly, the reject message can be a LOCATION UPDATING REJECT message, a ROUTING AREA UPDATE REJECT message, an ATTACH REJECT message, a DETACH REQUEST message of a detach procedure using the LTE, UMTS or GSM/GPRS RAT, a TRACKING AREA UPDATE REJECT message, or a SERVICE REJECT message. In addition, any of the abovementioned message can include at least of a cause of "Illegal MS", "Illegal ME", "GPRS services not allowed", and "GPRS services and non-GPRS services not allowed" for example.

Figure 4:
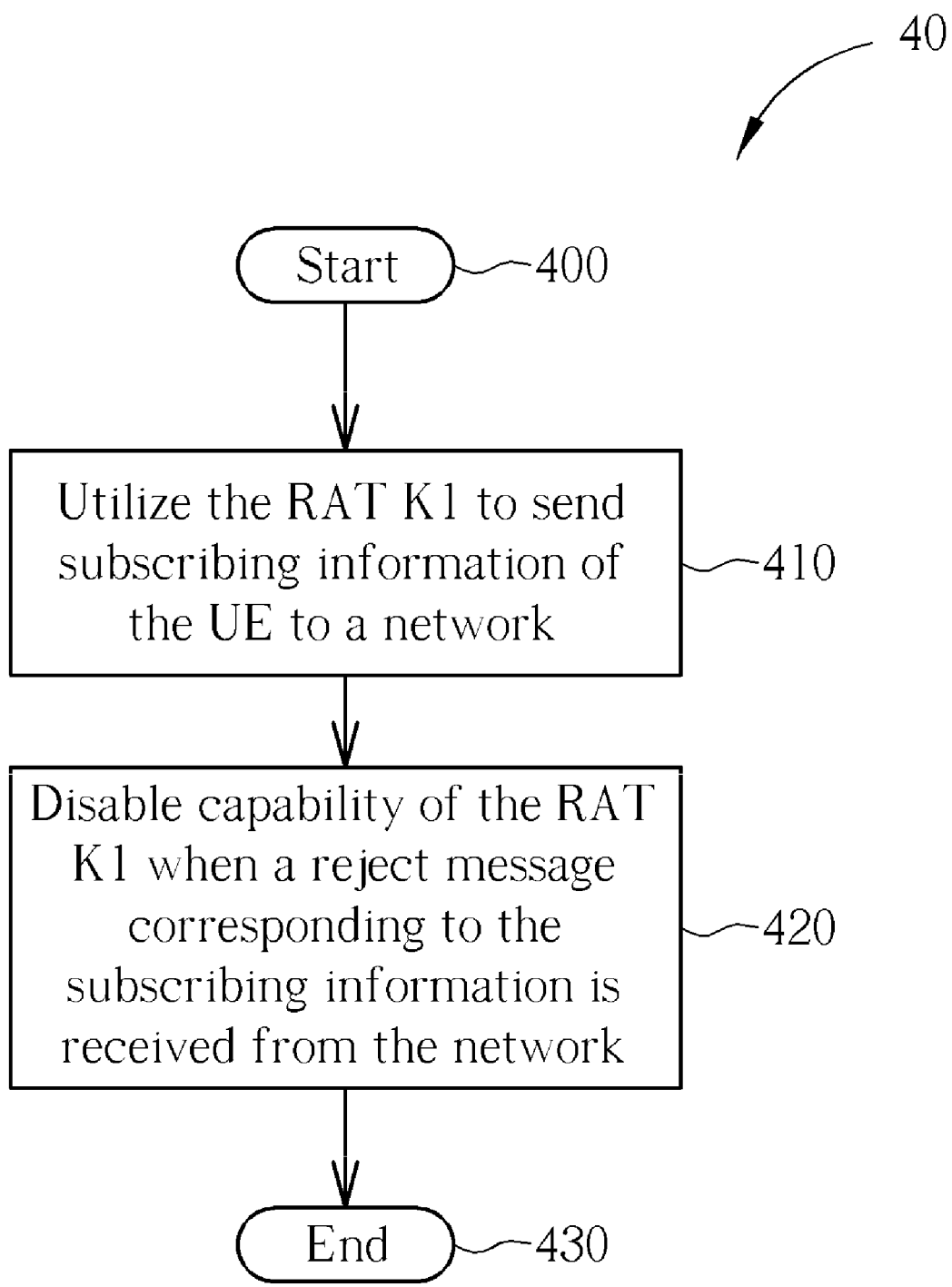
FIG. 4 is another exemplary flowchart of an exemplary process.

Please refer to FIG. 4, which illustrates a flowchart of an exemplary process 40. The exemplary process 40 is utilized for setting radio access capability for a UE capable of RATs K1-Kn in a wireless communication system. The exemplary process 40 can be compiled into the program code 214 and includes the following steps:

Step 400: Start.

Step 410: Utilize the RAT K1 to send subscribing information of the UE to a network.

Step 420: Disable capability of the RAT K1 when a reject message corresponding to the subscribing information is received from the network.

Step 430: End.

According to the exemplary process 40, the UE utilizes the RAT K1 to send the subscribing information to a network and disables capability of the RAT K1 when receiving the reject message. Furthermore, the UE then can utilize any of the RATs K2-Kn to send the subscribing information and/or capability information indicating that capability of the RAT K1 has been removed. In other words, the UE is forbidden to select or reselect RAT K1. The property and examples of reject message and subscribing information may refer to description related to FIG. 3.

When the UE request the network for a connection establishment via the RAT K1, the UE turns to use other RATs for the connection establishment when the reject message with respect to the RAT K1 is received. The exemplary process 40 avoids the connection establishment.

Figure 5:
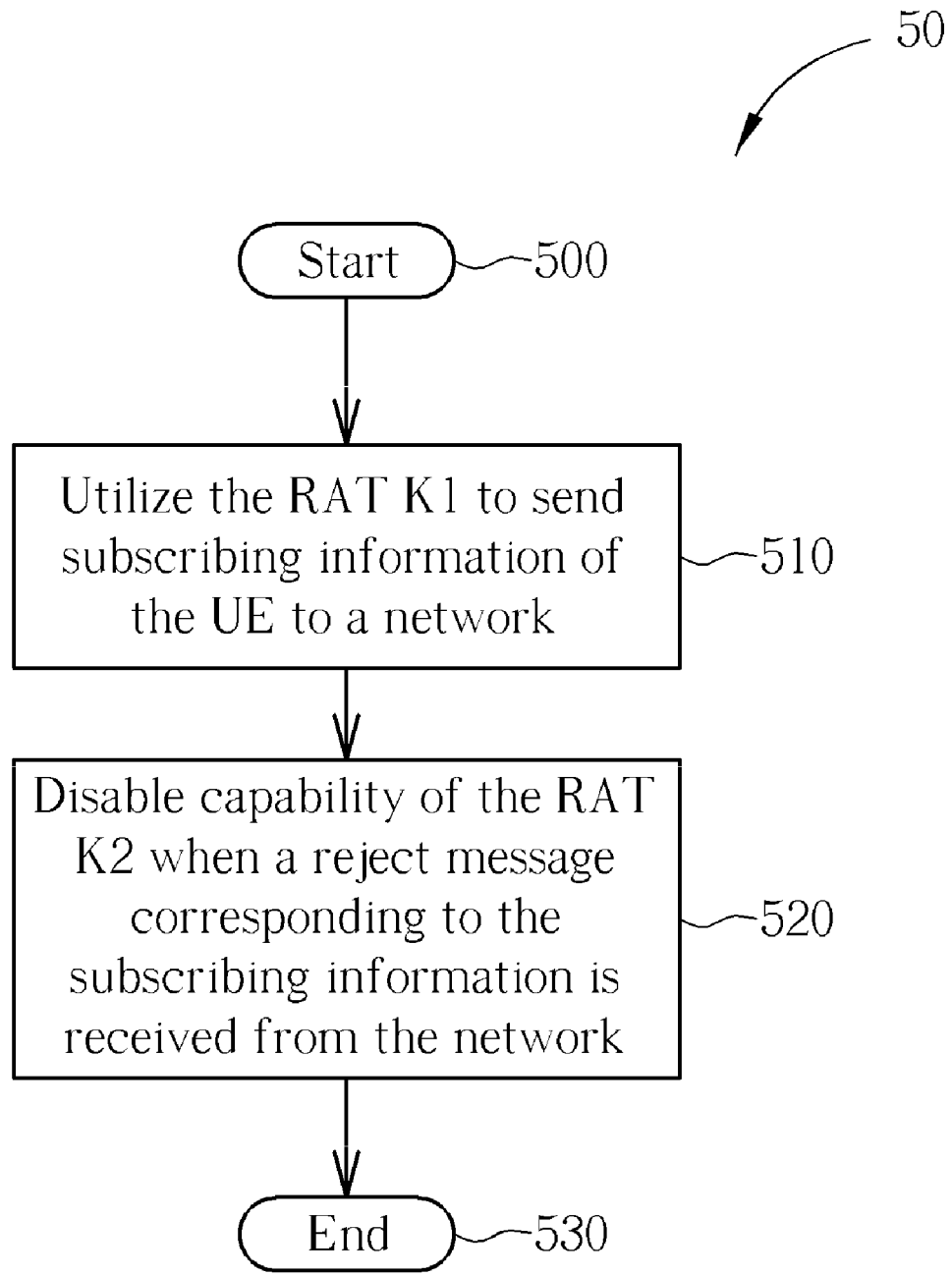
FIG. 5 is another exemplary flowchart of an exemplary process.

Please refer to FIG. 5, which illustrates a flowchart of an exemplary process 50. The exemplary process 50 is utilized for setting radio access capability for a UE capable of RATs K1-Kn in a wireless communication system. The exemplary process 50 can be compiled into the program code 214 and includes the following steps:

Step 500: Start.

Step 510: Utilize the RAT K1 to send subscribing information of the UE to a network.

Step 520: Disable capability of the RAT K2 when a reject message corresponding to the subscribing information is received from the network.

Step 530: End.

According to the exemplary process 50, the UE utilizes the RAT K1 to send the subscribing information to a network and disables capability of the RAT K2 when receiving the reject message. Furthermore, the UE then can utilize any of the RATs K1 or K3-Kn to send the subscribing information and/ or capability information indicating that capability of the RAT K2 has been removed. In other words, the UE is forbidden to select or reselect RAT K2. The RAT K2 may have higher priority than RAT K1 in RAT selection. For example, when the access to the UMTS, GSM or GPRS RAT is rejected, the UE can disable the LTE capability which owns higher priority over the UMTS, GSM and GPRS RATs in RAT cell reselection. The property and examples of reject message and subscribing information may refer to description related to FIGS. 3/4.

In conclusion, the abovementioned examples used in the UE can solve the problem of keeping request an access to a RAT whose network may always reject the access request.

Please note that all of the abovementioned steps in the exemplary processes described above including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20 in which the processor 200 processes the program code 214 related to the exemplary process 30 and the processed results transfer the communication device 20 to a state of being able to access a RAT for call establishment, especially the emergency call establishment, when access to the previously-selected RAT is rejected by the network.

Those skilled in the art will readily observe that numerous modifications and alterations of the device and method may be made while retaining the teachings and without departing from the spirit and scope. Accordingly, the above disclosure should be construed as limited only by the metes and bounds of the appended claims.

What is claimed is:

1. A method of setting radio access capability for a mobile device capable of a plurality of radio access technologies (RATs), the method comprising:

utilizing a first RAT of the plurality of RATs to send subscribing information of the mobile device to a network;

receiving a reject message corresponding to the subscribing information from the network;

selecting a second RAT from the plurality of RATs;

sending the subscribing information according to the second RAT; and utilizing the second RAT to send capability information to the network after the capability of the first RAT is disabled, wherein the capability information indicates that capability of the first RAT is removed.

2. The method of claim 1, wherein the subscribing information of the mobile device includes at least one of a mobile identity, a LOCATION UPDATING REQUEST message, a ROUTING AREA UPDATE REQUEST message, an ATTACH REQUEST message, a TRACKING AREA UPDATE REQUEST message and a SERVICE REQUEST message; and the reject message is a LOCATION UPDATING REJECT message, a ROUTING AREA UPDATE REJECT message, an ATTACH REJECT message, a TRACKING AREA UPDATE REJECT message, or a SERVICE REJECT message; and the reject message comprises at least one cause of "Illegal MS", "Illegal ME", "GPRS services not allowed", and "GPRS services and non-GPRS services not allowed".

3. The method of claim 1 further comprising requesting the network for a call establishment utilizing the second RAT.

4. The method of claim 1 further comprising disabling capability of the first RAT when the reject message is received from the network.

5. A communication device of a wireless communication system for accurately setting radio access capability (RAT), the communication device comprising:

a non-transitory computer readable recording medium for storing a program code corresponding to a process; and a processor coupled to the computer readable recording medium, for processing the program code to execute the process;

wherein the process comprises:

sending subscribing information of the communication device to a network according to a first RAT of a plurality of RATs supported by the communication device; and receiving a reject message corresponding to the subscribing information from the network;

selecting a second RAT from the plurality of RATs;

sending the subscribing information according to the second RAT;

disabling capability of the first RAT when the reject message is received from the network; and utilizing the second RAT to send capability information to the network after the capability of the first RAT is disabled, wherein the capability information indicates that capability of the first RAT is removed.

6. The communication device of claim 5, wherein the subscribing information of the communication device includes at least one of a mobile identity, a LOCATION UPDATING REQUEST, a ROUTING AREA UPDATE REQUEST message, an ATTACH REQUEST message, a TRACKING AREA UPDATE REQUEST message, and a SERVICE REQUEST message.

7. The communication device of claim 5, wherein the reject message is a LOCATION UPDATING REJECT, a ROUTING AREA UPDATE REJECT message, an ATTACH REJECT message, a TRACKING AREA UPDATE REJECT message, or a SERVICE REJECT message; and the reject message comprises at least one cause of "Illegal MS", "Illegal ME", "GPRS services not allowed", and "GPRS services and non-GPRS services not allowed".

8. The communication device of claim 5, wherein the process further comprises requesting the network for an emergency call establishment utilizing the second RAT.

9. A method of setting radio access capability for a mobile device capable of a plurality of radio access technologies (RATs), the method comprising:
   utilizing a first RAT of the plurality of RATs to send subscribing information of the mobile device to a network;
   disabling capability of one of the plurality of RATs when a reject message corresponding to the subscribing information is received from the network; and
   utilizing a second RAT of the plurality of RATs to send capability information to the network, wherein the second RAT is not the disabled RAT and the capability information indicates that capability of the first RAT is removed.

10. The method of claim 9, wherein the subscribing information of the mobile device includes at least one of a mobile identity, a LOCATION UPDATING REQUEST, an ATTACH REQUEST message, a TRACKING AREA UPDATE REQUEST message and a SERVICE REQUEST message; and the reject message is a LOCATION UPDATING REJECT, an ATTACH REJECT message, a TRACKING AREA UPDATE REJECT message or a SERVICE REJECT message; and the reject message comprises at least one of a cause of "Illegal MS", "Illegal ME", "GPRS services not allowed", and "GPRS services and non-GPRS services not allowed".

11. The method of claim 9 further comprising requesting the network for a call establishment utilizing the second RAT.

12. A communication device of a wireless communication system for accurately setting radio access capability (RAT), the communication device comprising:
   a non-transitory computer readable recording medium for storing a program code corresponding to a process; and
   a processor coupled to the computer readable recording medium, for processing the program code to execute the process;
   wherein the process comprises:
   sending subscribing information of the communication device to a network according to a first RAT of a plurality of RATs supported by the communication device;
   disabling capability of one of the plurality of RATs when a reject message corresponding to the subscribing information is received from the network;
   utilizing a second RAT of the plurality of RATs to send capability information to the network, wherein the second RAT is not the disabled RAT and the capability information indicates that capability of the first RAT is removed.

13. The communication device of claim 12, wherein the subscribing information of the mobile device includes at least one of a mobile identity, a LOCATION UPDATING REQUEST, a ROUTING AREA UPDATE REQUEST message, an ATTACH REQUEST message, a TRACKING AREA UPDATE REQUEST message and a SERVICE REQUEST message.

14. The communication device of claim 12, wherein the reject message is a LOCATION UPDATING REJECT, a ROUTING AREA UPDATE REJECT message, an ATTACH REJECT message, a TRACKING AREA UPDATE REJECT message or a SERVICE REJECT message; and the reject message comprises at least one cause of "Illegal MS", "Illegal ME", "GPRS services not allowed", and "GPRS services and non-GPRS services not allowed".

15. The communication device of claim 12, wherein the process further comprises requesting the network for a call establishment utilizing the second RAT.

* * * * *